United States Patent [19]

Cusick, III

[11] Patent Number: 4,544,827
[45] Date of Patent: Oct. 1, 1985

[54] WELDING POWER CONDUCTOR ASSEMBLY

[75] Inventor: Joseph B. Cusick, III, Peck, Kans.

[73] Assignee: Tweco Products, Inc., Wichita, Kans.

[21] Appl. No.: 620,855

[22] Filed: Jun. 15, 1984

[51] Int. Cl.[4] .............................................. B23K 9/00
[52] U.S. Cl. ................. 219/137.63; 174/89; 219/137.9
[58] Field of Search ...................... 219/137.63, 137.9; 174/15 WF, 75 C, 89

[56] References Cited

U.S. PATENT DOCUMENTS

| | | | |
|---|---|---|---|
| 3,629,547 | 12/1971 | Kester et al. | 219/137.63 |
| 3,740,453 | 6/1973 | Callaghan et al. | 174/89 |
| 4,297,561 | 10/1981 | Townsend et al. | 219/137.63 |

Primary Examiner—Roy N. Envall, Jr.
Assistant Examiner—Alfred S. Keve
Attorney, Agent, or Firm—Majestic, Gallagher, Parsons & Siebert

[57] ABSTRACT

In a welding gun apparatus, an improved electrical power conductor assembly in which electrical conduit wire may be readily secured to a cable connector body while the structural integrity of the conduit wire is maintained. Conduit wire is fastened to the connector body by means of an axially movable connector sleeve which secures the wire against a tapered mandrel on the connector body. A pressure nut threadably adapted to the connector body controls the axial position of the connector sleeve.

9 Claims, 3 Drawing Figures

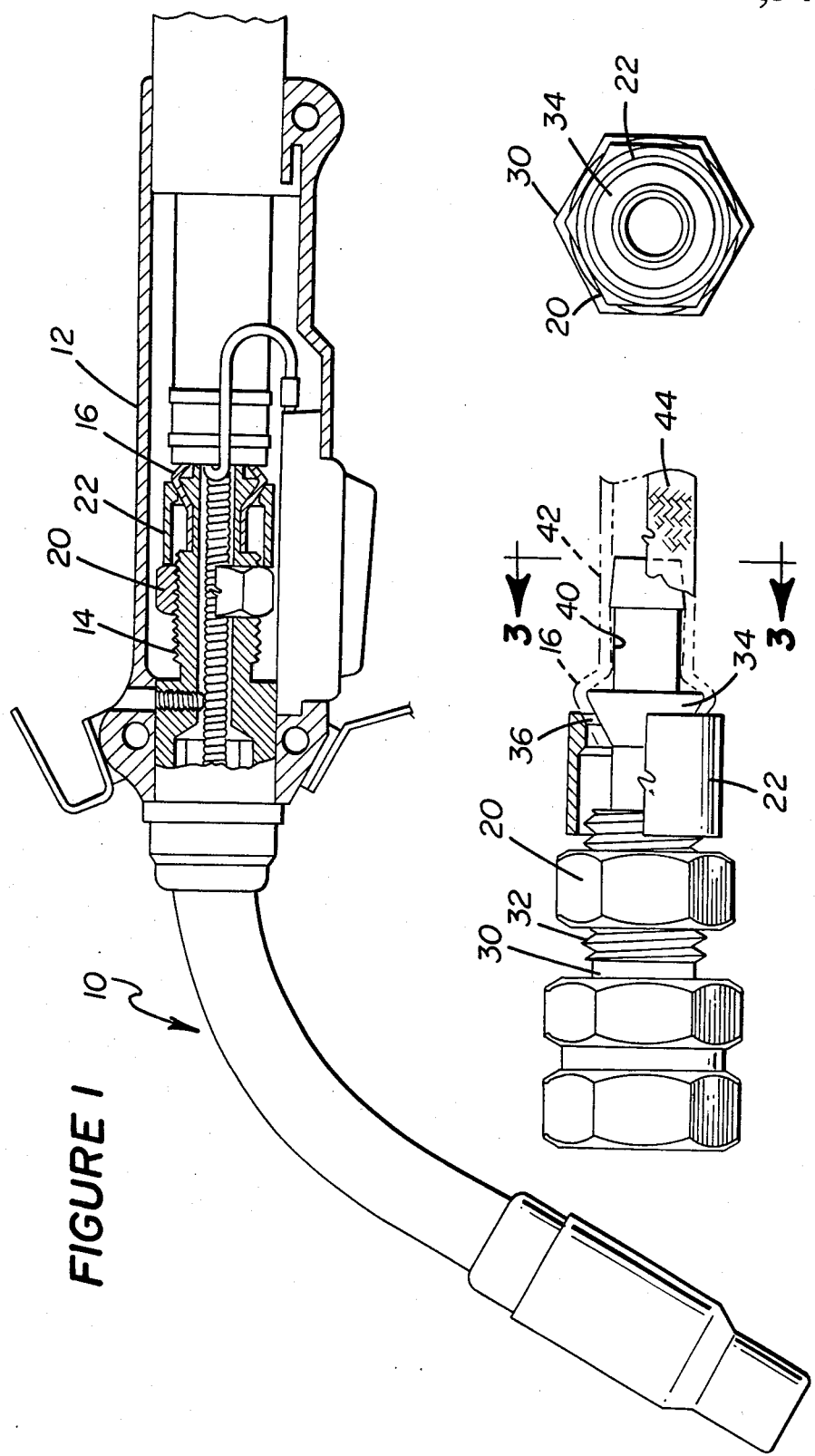

WELDING POWER CONDUCTOR ASSEMBLY

BACKGROUND OF THE INVENTION

1. Field of the Invention

This invention relates generally to a welding gun apparatus, and more particularly, relates to an improved power conductor assembly for a welding gun apparatus.

2. Description of the Prior Art

Welding devices in which a welding wire electrode is supplied to a welding zone through a gun structure are well known in the prior art. These devices are normally equipped with a supply inlet and transmission means for circulating coolant throughout the gun as well as with a means for directing an inert shielding gas toward the welding zone to prevent contamination. In addition, a means for transmitting electrical power from a source, through the gun, and to the welding tip is necessary.

U.S. Pat. No. 3,629,547, assigned to the same assignee, for example, shows a semiautomatic welding apparatus having a welding gun assembly connected through several adapter structures to gas, welding wire, and power cable supply sources. U.S. Pat. No. 4,297,561, also assigned to the same assignee, shows a similar apparatus with an improved handle assembly including a removable, adjustable tube assembly within the welding gun. U.S. Pat. Nos. 3,629,547 and 4,297,561 are entirely incorporated herein by reference, and parts not shown in the drawings herein are illustrated in detail in U.S. Pat. No. 4,297,561.

This invention is directed toward an improved welding power conductor assembly. In the improved assembly, electrical conductor wire may be secured onto a power cable connector body without causing abrasion of the wire or any of the strands contained therein. Prior such power conductor assemblies involved the securing of electrical conductor wire by means of a rotationally advancing connector sleeve, which rotation resulted in the twisting and breaking of much of the conductor wire as it was secured. Such breakage resulted in poor electrical contact and an inadequate mechanical connection between the conductor wire and the power cable connector body. Additionally, the abraded wire caused difficulty in reassembly and required frequent "cutting back". The apparatus of this invention eliminates these problems by introducing the connector sleeve as a separate component from a pressure nut threadably adapted to the power cable connector body; thus, while the pressure nut advances rotationally along the generally elongated power cable connector body, which connector body defines an axis, the connector sleeve is moved axially along that connector body by the advancing pressure nut. The electrical conductor wire is secured between the connector sleeve and a tapered mandrel extending outwardly from the connector body, in an axial rather than in a rotational manner. Structural integrity of the wire is therefore maintained.

SUMMARY OF THE INVENTION

The invention is an improved welding gun electrical power conductor assembly in which electrical conductor wire may be readily secured to a power cable connector body while the structural integrity of the conductor wire is maintained.

Accordingly, it is an object of this invention to provide an electrical power conductor assembly having a means for securing electrical conductor wire to a power cable connector body while maintaining the structural integrity of the conductor wire.

It is a further object of this invention to provide an electrical power conductor assembly having a means for securing electrical conductor wire to a power cable connector body in an axial rather than in a rotational manner.

It is another object of this invention to provide an electrical power conductor assembly having a power cable connector body with threads defined thereon, a pressure nut threadably adapted to the connector body, a tapered mandrel extending outwardly from the connector body, and a connector sleeve positioned between the pressure nut and the mandrel in such a way that electrical conductor wire may be axially secured between the connector sleeve and the mandrel upon advancement of the pressure nut toward the mandrel.

It is yet another object of this invention to provide an electrical power conductor assembly in which electrical conductor wire may be axially secured to a power cable connector body by means of a connector sleeve having an internal structure angularly adapted to mate with a tapered mandrel extending outwardly from the power cable connector body, such that the conductor wire may be axially secured between the connector sleeve and the tapered mandrel.

It is another object of this invention to provide an electrical power conductor assembly in which electrical conductor wire having a plurality of strands and an inner insulative layer, an outer insulative layer, and a conductive layer contained therebetween, may be axially secured to a power cable connector body.

Further objects and advantages of this invention will become apparent from the study of the following portion of the specification, the claims and the attached drawings.

BRIEF DESCRIPTION OF THE DRAWINGS

FIG. 1 is a side view of the gun assembly and a partial sectional view of the improved power conductor assembly.

FIG. 2 is a side view of the power conductor assembly and shows electrical conductor wire secured between the connector sleeve and the tapered mandrel.

FIG. 3 is a view of the power conductor assembly taken along lines 3—3 in FIG. 2.

DETAILED DESCRIPTION OF THE PREFERRED EMBODIMENT

A preferred embodiment of the improved welding gun power conductor assembly is shown in FIGS. 1 through 3. FIG. 1 illustrates the improved power conductor assembly 14 positioned in handle 12 of the welding gun apparatus shown generally at 10.

As seen in FIG. 2, pressure nut 20 is threadably adapted to power cable connector body 30 by means of threads 32. Connector sleeve 22 is axially movable along the generally elongated power cable connector body 30 and is positioned intermediate pressure nut 20 and tapered mandrel 34. As pressure nut 20 is rotationally advanced toward connector sleeve 22, connector sleeve 22 is axially advanced toward tapered mandrel 34. Electrical conductor wire 16 may be secured between connector sleeve 22 and the outermost portion of tapered mandrel 34 in an axial rather than in a rotational manner, thus reducing the likelihood of abrasion of the conductor wire.

Tapered ridge 36 on the inner surface of connector sleeve 22, shown in FIG. 3, is angularly adapted to mate with tapered mandrel 34 so that continued electrical contact and a strong mechanical connection is ensured between electrical conductor wire 16 and power cable connector body 30. Electrical conductor wire 16 may include a plurality of strands and be arranged within an inner insulative layer 40, and an outer insulative layer 42, so as to form a cable assembly 44.

While the invention has been described in conjunction with preferred specific embodiments thereof, it will be understood that this description is intended to illustrate and not limit the scope of the invention which is defined by the following claims.

I claim:

1. In a welding gun apparatus having a handle and a means for communicating electrical power to a welding tip, the improvement comprising a means for securing electrical conductor wire to said assembly, wherein said securing means comprises a pressure nut which is rotationally movable against a connector sleeve so as to cause non-rotational movement of said sleeve against said conductor wire, whereby said conductor wire is secured within said sleeve without abrasion.

2. The apparatus of claim 1, wherein said securing means further comprises an elongated power cable connector body defining an axis, threads defined thereon such that said pressure nut is threadably engageable with said connector body, and a tapered mandrel extending outward from said connector body, and wherein said connector sleeve is positioned between said pressure nut and said mandrel so that said conductor wire is secured between said connector sleeve and said mandrel upon the advancing of said pressure nut toward said mandrel.

3. The apparatus of claim 2, wherein said connector sleeve is axially movable along said connector body.

4. The apparatus of claim 3, wherein said connector sleeve includes a tapered ridge at one end thereof.

5. The apparatus of claim 4, wherein said ridge extends inward from the inner surface of said sleeve.

6. The apparatus of claim 5, wherein said ridge and said mandrel define complementary angles so that said conductor wire is securely fastened therebetween.

7. The apparatus of claim 1, wherein said conductor wire comprises an inner insulative layer, an outer insulative layer, and a conductive layer contained therebetween.

8. The apparatus of claim 7, wherein said conductive layer comprises a plurality of conductive strands.

9. The apparatus of claim 1, wherein said conductor assembly is contained within said handle.

* * * * *